United States Patent [19]

Groeber

[11] 4,353,772
[45] Oct. 12, 1982

[54] APPARATUS FOR WINDING FORCE TRANSMITTING ELEMENTS OF FIBER REINFORCED MATERIALS

[75] Inventor: Josef Groeber, Munich, Fed. Rep. of Germany

[73] Assignee: Messerschmitt-Bolkow-Blohm Gesellschaft mit beschrankter Haftung, Munich, Fed. Rep. of Germany

[21] Appl. No.: 231,594

[22] Filed: Feb. 5, 1981

[30] Foreign Application Priority Data

Feb. 15, 1980 [DE] Fed. Rep. of Germany ....... 3005654

[51] Int. Cl.³ .......................................... B65H 81/00
[52] U.S. Cl. ................................... 156/433; 156/166; 156/425
[58] Field of Search .............. 156/175, 173, 172, 174, 156/168, 166, 425, 443, 446, 447, 441, 433; 242/7.05 C, 7.21, 7.02

[56] References Cited

U.S. PATENT DOCUMENTS

| | | | |
|---|---|---|---|
| 3,169,301 | 2/1965 | Fletcher et al. | 242/7.05 C |
| 3,260,796 | 7/1966 | Hirtzer | 156/172 |
| 3,577,294 | 5/1971 | David | 156/173 |
| 3,645,829 | 2/1972 | Palfneyman et al. | 156/169 |
| 3,701,489 | 10/1972 | Goldsworthy et al. | 156/172 |
| 4,097,322 | 6/1978 | Green et al. | 156/425 |
| 4,114,962 | 9/1978 | Konis | 308/238 |
| 4,118,262 | 10/1978 | Abbott | 156/425 |
| 4,226,916 | 1/1980 | Schultze et al. | 156/173 |

FOREIGN PATENT DOCUMENTS 2736124 3/1979 Fed. Rep. of Germany .

*Primary Examiner*—Michael W. Ball
*Attorney, Agent, or Firm*—W. G. Fasse; D. H. Kane, Jr.

[57] ABSTRACT

A winding apparatus is disclosed for winding force transmitting elements of fiber reinforced materials. Such force transmitting elements are used, for example, for connecting helicopter rotor blades to the rotor head. A cylindrical winding carrier is mounted for rotation on a machine frame. The fiber strand feeding device is mounted for translation on the frame. A plurality of separate winding cores are distributed around the carrier. Relative motion of the carrier and fiber strand feeding device is controlled, for example, by computer to achieve the desired windings on the separate cores, so that at least one set of elements is produced simultaneously under the same winding conditions, whereby all the members of a set have uniform characteristics, especially force transmitting characteristics.

4 Claims, 8 Drawing Figures

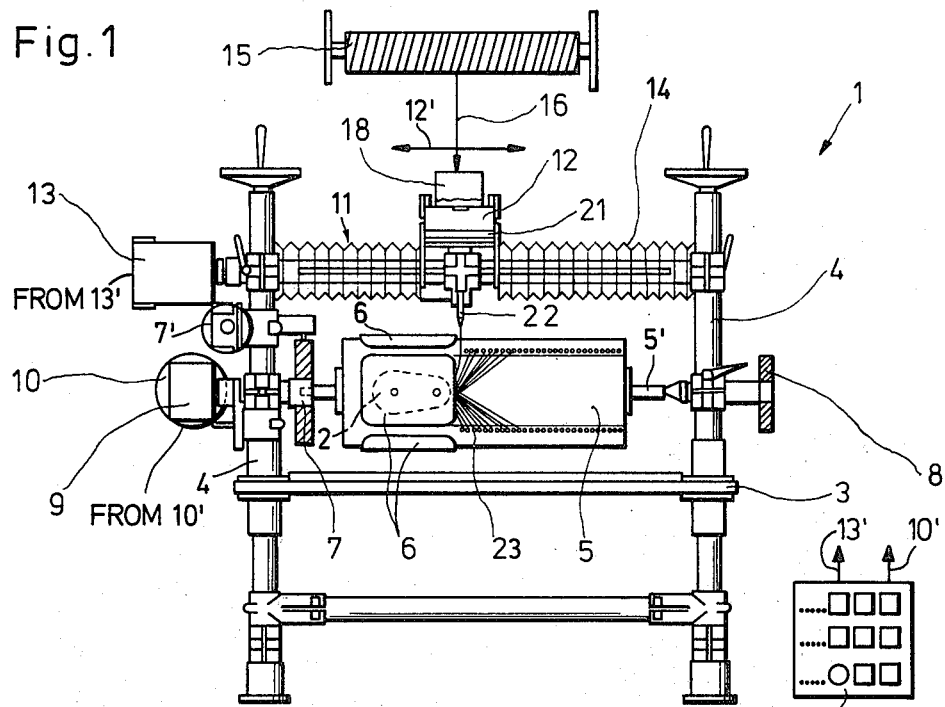
Fig. 1
Fig. 1a
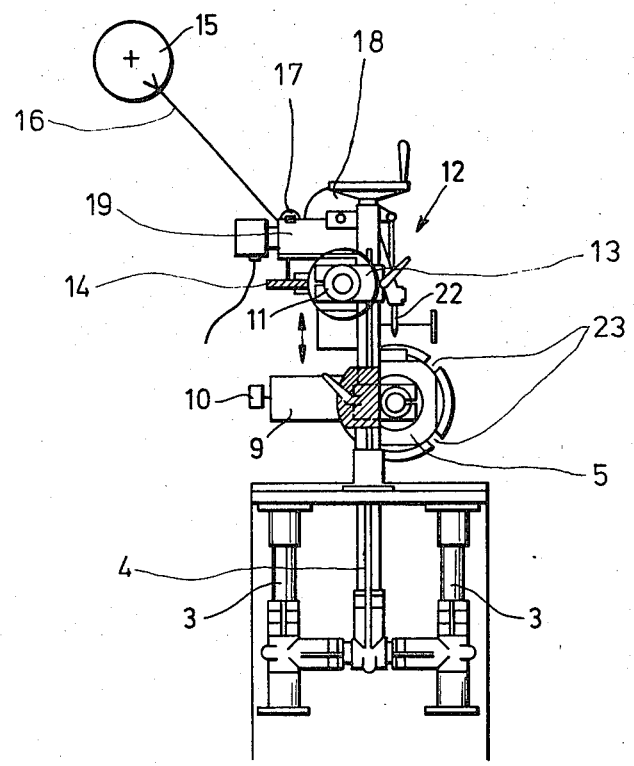
Fig. 2

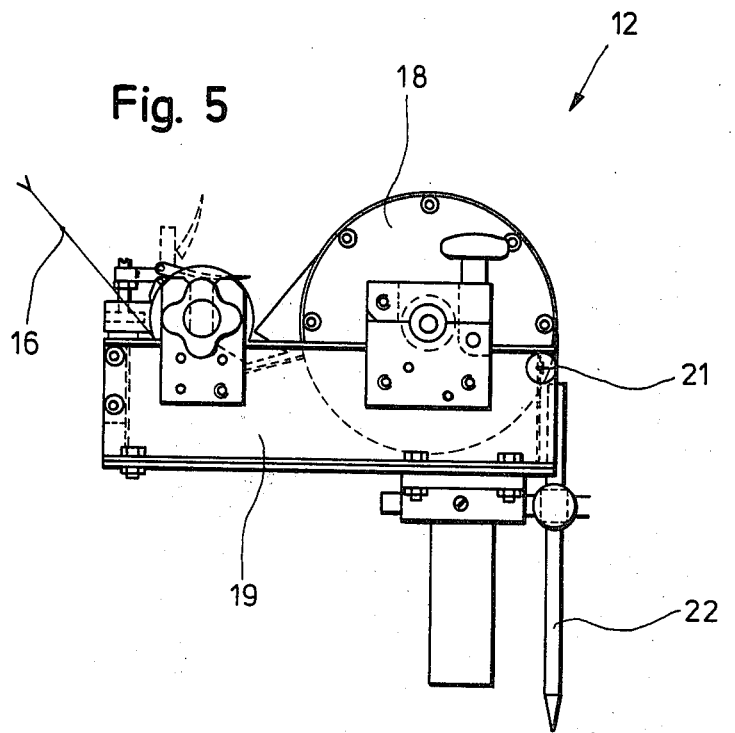
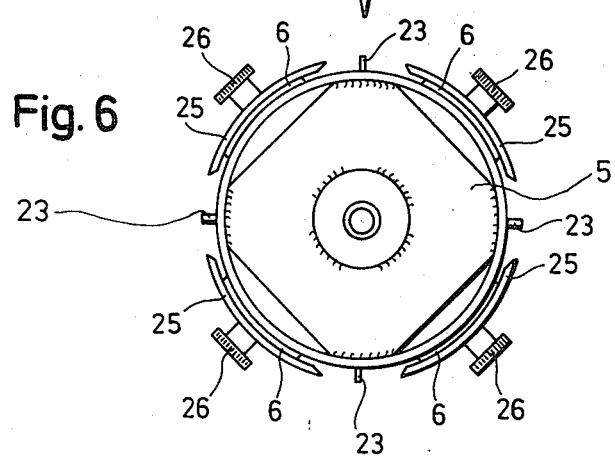

APPARATUS FOR WINDING FORCE TRANSMITTING ELEMENTS OF FIBER REINFORCED MATERIALS

CLAIM TO PRIORITY

The present application is based on the corresponding German Patent Application No. P 30 05 654.3-16, filed in the Federal Republic of Germany on Feb. 15, 1980. The priority of said German filing date is hereby expressly claimed.

BACKGROUND OF THE INVENTION

The invention relates to an apparatus for winding of force transmitting elements made of uni-directional fiber strands constituting a fiber reinforced material. Conventionally such winding machines comprise a winding core and a supply device as well as an impregnating device for the fiber strands. The winding core and the strand supply device are arranged for relative movement between each other so that the laying down of windings or turns on the winding core is controllable by controlling the relative movement between the supply device and the winding core.

Force transmitting elements of this type which are made of uni-directional fiber strands are presently frequently used where large uni-directional loads occur, for example, for connecting the wings or blades of a helicopter rotor to the rotor head. Such force transmitting elements frequently have a loop or bight shape, whereby the fiber direction within the force transmitting element extends in the load transmitting direction. As mentioned, such load or force transmitting elements are suitable for securing the rotor blade of a helicopter rotor to the respective hardware components of the rotor head. Heretofore such force transmitting elements have either been made in a rather expensive manner by a hand winding operation or they have been wound by a machine as disclosed in U.S. Pat. No. 4,226,916 corresponding to German Patent Publication (DE-OS) No. 2,736,124.

It is necessary that such force transmitting elements have uniform physical characteristics. At the very least, a set of force transmitting elements, for example comprising four such elements to be installed in a rotor, should have the same physical characteristics for each of its elements.

It is necessary to make sure that all force transmitting elements of a set have substantially the same physical characteristics in order to minimize any variations in shape and loadability to thereby enable the construction of a balanced helicopter rotor. Such uniformity calls for a precise and time consuming manufacturing operation of the individual elements. Variations from element to element occur especially when the tension load of the fiber strand as it is being wound onto a core is subject to variation during the winding of the force transmitting element. The prior art methods, regardless whether they involve manual or machine windings, have not been satisfactory in assuring the required uniformity for at least a set of four force transmitting elements which are required in the manufacturing of a helicopter rotor.

OBJECTS OF THE INVENTION

In view of the foregoing it is the aim of the invention to achieve the following objects singly or in combination:

to construct a machine for winding force transmitting elements of the above type which is capable of producing such elements in an efficient and economical manner thereby simultaneously assuring that the physical characteristics of the elements are substantially uniform at least from set to set of such elements;

to minimize the variations in the shape as well as in the force transmitting ability of such elements;

to minimize the time required for manufacturing force transmitting elements of loop or bight shape made of fiber reinforced materials as compared to the prior art manual or as compared to the prior art machine type of winding operation; and to provide a winding apparatus and method which assures uniform winding conditions throughout an entire winding operation for all force transmitting elements produced simultaneously in such a winding operation.

SUMMARY OF THE INVENTION

According to the invention there is provided an apparatus for the winding of force transmitting elements of uni-directional fiber strands of a fiber reinforced material, said apparatus including a winding core and a strand supply device as well as a strand impregnating device, whereby the winding core and the strand supply device are movable relative to each other in a controlled manner for applying the turns of the fiber strands onto the winding core. Such an apparatus is characterized according to the invention by a winding cylinder which is adapted for carrying a plurality of winding cores simultaneously. The winding cores are distributed about the circumference of the winding cylinder. The winding cylinder and the strand supply device are movable relative to each other in a controlled manner for applying windings or turns of a single fiber strand to all winding cores. According to a preferred embodiment one turn or one winding is applied sequentially to each core on the winding cylinder.

Thus, such a machine is capable of winding simultaneously a plurality of force transmitting elements, normally four such elements. Since all four elements are manufactured from the same single fiber strand, it becomes possible to make four force transmitting elements having the same shape and the physical characteristics of which do not differ from one another in practical respect. This uniformity is even enhanced by the sequential placing of one turn at a time on each winding core because it assures a uniform strand tension throughout the winding operation.

By manufacturing all elements of a set of elements from a single fiber strand it is assured in an advantageous manner that all elements have a uniform load bearing capacity. The strand tension of the fiber strands during the winding operation is the same for all elements produced on the same winding cylinder. Another advantage is seen in that the manufacturing steps may be substantially economized or rationalized because a winding machine according to the invention can be controlled by a relatively simple means including a computer such as a microcomputer. It has been found that the time necessary for manufacturing such force transmitting elements has been substantially reduced as compared to the manual manufacturing and also as compared to prior art machine type winding operations.

Preferably the winding cylinder or so-called carrier for the individual winding core is a roller. This type of carrier has the advantage that the feeding device for the fiber strand is merely required to move back and forth in the axial direction of the roller or carrier cylinder. The strand feeding device comprises a guide member, for example, a strand guiding pipe, the free end of which reaches substantially close to the cylinder surface where it releases the fiber strand. Aligned between the individual winding cores there are arranged on the carrier cylinder, holding and guide elements for the fiber strands, for example, in the form of a plurality of guide pins. The angular position of the fiber strands relative to the winding core or relative to the rotational axis of the winding cylinder may be determined by the arrangement of the guide pins and by selecting a particular guide pin for the respective winding turn of the fiber strand. The winding cores are exchangeably secured to the winding carrier or cylinder and the shape of the winding cores may be adapted to any individual requirement. The machine may be retooled for different winding core shapes by simply inserting a new program, for example, by means of encoding switches or the like. Further, it is possible to employ a completely new winding pattern program simply by means of so-called electronic logic insert cards which carry the program on a magnetic recording which controls the winding operation of the machine automatically. During the winding operation which takes place automatically, the operator may perform other operational steps, for example, such as are necessary for the further treatment of the force transmitting element.

BRIEF FIGURE DESCRIPTION

In order that the invention may be clearly understood, it will now be described, by way of example, with reference to the accompanying drawings, wherein:

FIG. 1 shows a simplified front elevational view of a winding machine according to the invention in which the carrier for several winding cores is a cylinder;

FIG. 1a shows schematically in block form a computer with its keyboard for controlling the drive means in FIG. 1;

FIG. 2 is an elevational side view of the apparatus according to FIG. 1;

FIG. 5 is a side view of the strand feeding device on an enlarged scale as compared to the same view of the upper part of FIG. 2;

FIG. 6 is an end view of the winding cylinder carrying four winding cores. The winding cylinder is in operative position relative to the strand feeding device of FIG. 5.

Figure 3:
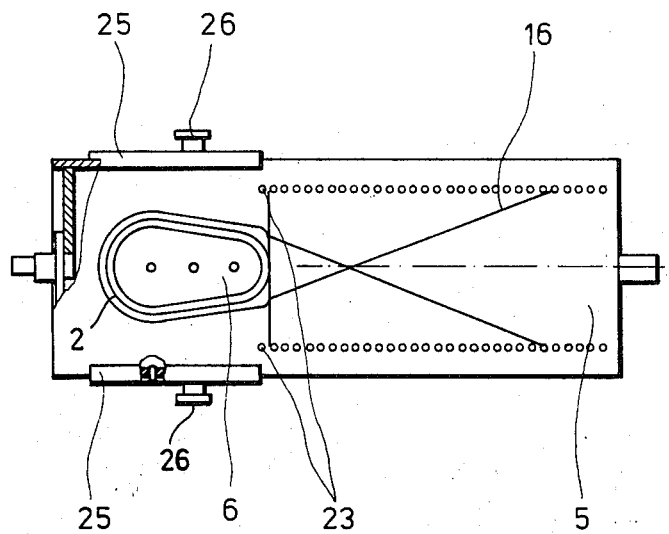
FIG. 3 is a top plan view or side view under the winding core carrier in the form of a roller or a cylinder.

DETAILED DESCRIPTION OF PREFERRED EXAMPLE EMBODIMENTS AND OF THE BEST MODE OF THE INVENTION

FIGS. 1 and 2 show front and side elevational views of a winding apparatus 1 according to the invention for winding several force transmitting elements 2 simultaneously onto winding cores 6 carried on a winding carrier or cylinder 5. The carrier is supported in a machine frame or bed 3 having at least two upright posts 4 one of which is arranged at each end of the machine bed 3. The winding core carrier cylinder 5 is clamped between the posts 4 in a rotatable manner. For this purpose the rotational axis 5' of the cylinder 5 is held at its left hand end in a cam drive disc 7 cooperating with a cam follower device 7'. The right hand end of the shaft 5' is held and centered in a rotatable manner by a centering device 8. The winding core carrying cylinder 5 supports a plurality of winding cores 6. For example, four such cores 6 are distributed about the circumference of the cylinder 5 and spaced from one another by 90° as best seen in FIG. 6. The above mentioned cam follower disc 7 is operatively connected to a worm gear drive 9 driven by an adjustment motor 10.

Above the cylinder 5 and also held between the two upright posts 4 there is arranged a cross carrier or guide rail 11 on which the strand supply and impregnating device 12 is supported in a sliding manner. The strand supply and impregnating device 12 is movable back and forth on the cross carrier or guide rail 11 in cooperation with the ratchet bar 14 and driven by an adjustment motor 13. A threaded spindle for example, may be provided for the movement of the device 12. The strand supply device 12 is thus displaced along the cross carrier or guide rail 11 in a conventional manner by means of said adjustment motor 13 which in this example is a stepping motor. The steps are determined by the ratchet bar 14 arranged in parallel to the guide rail 11.

The computer 24 shown in FIG. 1a controls with its output 10' the adjustment motor 10 for rotating the winding cylinder 5. The output 13' of the computer 24 controls the adjustment or stepping motors 13 for the stepping of the strand supply device 12 back and forth along the guide rail 11 as indicated by the double arrow 12'.

The strand supply device 12 receives the strand 16 from a so-called warp beam including a supply spool for the fiber strand 16. These fiber strands may, for example, be made of carbon or glass fibers. The fiber strand 16 enters into the supply device 12 in contact with the downwardly facing side of a brake roller 17 which is adjustable for adjusting the tension of the fiber strand. Downstream of the tension adjusting brake roller 17 there is arranged an impregnating roller or cylinder 18 over which the strand 16 runs or slides. The impregnating roller 18 rotates with its lower half through a heatable resin bath 19 all as shown in greater detail in FIGS. 5 and 6.

Since the impregnating roller 18 carries a sufficient quantity of reaction resin mass (RRM) on its surface, the fiber strands 16 contacting the surface of the roller 18 are sufficiently impregnated. The quantity of RRM for the impregnation of the fiber strands is then adjusted in a manner known as such by a so-called resin stripper through which the strand moves. The stripper may, for example, be a plate with a hole of predetermined size through which the impregnated fiber strand moves to thereby strip off any excess resin which is returned into the bath 19.

The fiber strand 16 is then guided over a guide roller 21 and into a guide pipe 22, the free end of which ends just slightly above the surface of the winding cylinder 5. The spacing between the free end of the strand guide pipe 22 and the winding cylinder 5 is just sufficient to permit the rotation of the cylinder 5 as shown in FIGS. 5 and 6. The fiber strand 16 exits with its leading free end from the guide pipe 22 and such free strand end is then secured to a guide and holding pin 23 four rows of which are arranged on the cylinder 5 in longitudinal alignment with the spaces between the winding cores 6. For example, the free strand end may be tied or knotted to the pin 23. In the shown example embodiment the winding cores 6 are arranged at one end of the cylinder 5, whereas the holding and guide pins 23 are arranged on the remainder of the cylinder length. The rows of the pins 23 begin substantially directly at the inner edge of the winding cores 6.

Figure 4:
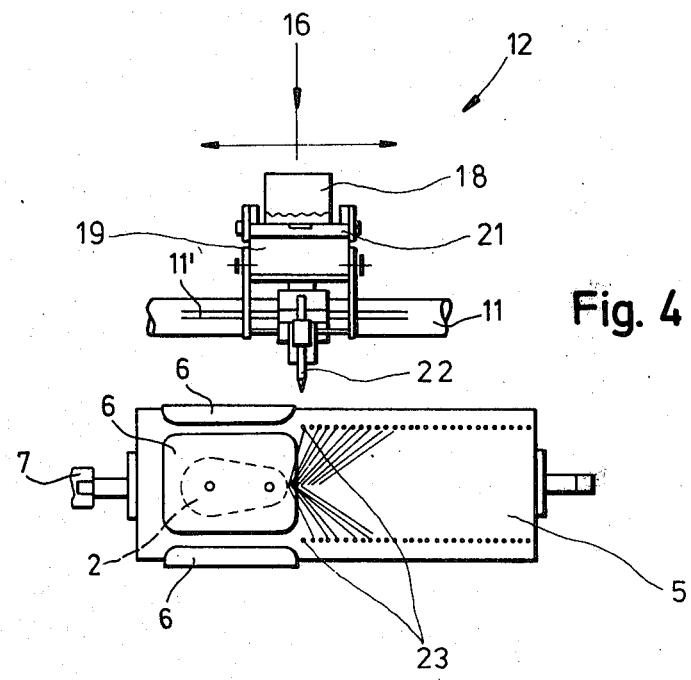
FIG. 4 shows a view of the central portion of FIG. 1 whereby the winding cylinder is shown on a somewhat enlarged scale.

As shown in FIGS. 3 and 4 it is possible by the use of the guide pins 23 to direct the fiber strand in such a manner on the winding cylinder 5 that the strand direction takes up an angle within the range of about 20° to about 90° relative to the longitudinal rotational axis of the winding cylinder 5.

The fiber strand 16 is wound off the supply spool or warp beam 15 due to the fact that either the winding cylinder 5 is rotated by the drive motor 10 and/or due to the fact that the strand supply device 12 is shifted along the guide rail 11 by the stepping motor 13. The control of the movement of the winding cylinder 5 and of the strand supply device 12 is accomplished by the computer 24 shown in FIG. 1a in which the entire winding program is stored, for example, by means of logic information carrying insert cards.

In operation the winding takes place as follows. First, one loop is placed around the first winding core 6. This is done manually by the operator. Then the fiber strand is guided around a holding and guide pin 23, whereby the winding cylinder 5 is rotated. Thereafter, a winding or loop is automatically placed around the next following winding core 6. This sequential placing of loops around the winding cores 6 one after the other, is repeated so that with each rotation of the cylinder 5 each winding core 6 has received one winding loop of the fiber strand. This feature of the invention makes sure that the individual turns or windings on each core 6 take up a defined position which is the same for all winding cores since the winding conditions are the same for all winding cores due to this sequential winding operation.

The described winding operation is repeated until all winding cores are completely filled, whereby each core carries a close force transmitting element having a loop or bight form as best seen in FIGS. 3 & 4. Upon completion of the winding operation the winding cores 6 are removed from the winding cylinder 5 and then the force transmitting elements 2 are removed from the cores 6.

The loops of the force transmitting element are then further treated in a manner known as such, for example, for the curing of the impregnating resin. The strand ends running around the pins 23 are cut off and the so formed loops are inserted into a rotor blade. As mentioned, the rotor blades are then connected through these loops to the hardware components of the rotor head of a helicopter.

Figure 3B:
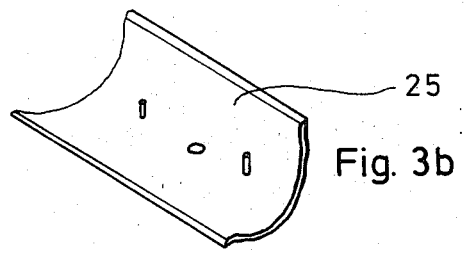
FIG. 3b is a cover plate one of which is provided for each winding core.

The winding cores 6 are secured, as shown in FIG. 6, to the cylinder 5 by knurled screws 26. Fitting pins are provided for precisely locating the cores 6 on the surface of the cylinder 5. Cover plates 25, one of which is shown in FIG. 3b, are also provided with fitting pins reaching through respective holes in the cores 6 to cover the cores, all as best seen in FIG. 6. The purpose of the cover plates 25 is to provide a mold, so to speak, for the bight shaped force transmitting elements to limit these elements in the radial direction of the winding cylinder 5 and to squeeze out any remaining excess resin during the winding operation.

In the described example embodiment, the winding cylinder 5 is round. However, other winding cylinder shapes could be contemplated. Further, the shape of the force transmitting elements can also vary in accordance with the individual requirements. It would be merely necessary to make the cores 6 in accordance with the required shape of the loops to be wound. In any of these embodiments the operation of the winding would be controlled by the program stored in the computer for a fully automatic winding sequence.

Although the invention has been described with reference to specific example embodiments, it will be appreciated, that it is intended, to cover all modifications and equivalents within the scope of the appended claims.

What is claimed is:

1. An apparatus for winding force transmitting elements having a given thickness and made of uni-directional fiber strands of a fiber reinforced material, comprising a machine frame, winding carrier means mounted for rotation on said machine frame, a plurality of winding cores distributed and arranged about the circumference of the winding carrier means, fiber strand supply means for supplying fiber strands to said plurality of winding cores, fiber strand impregnating means operatively arranged for impregnating a fiber strand on its way to said winding cores, said fiber strand supply means being mounted for translation on said machine frame, a plurality of fiber strand holding and guide elements (23) on said winding carrier means, first drive means for translating said fiber strand supply means relative to the machine frame and relative to the winding carrier means, second drive means for rotating said winding carrier means relative to the machine frame and relative to said fiber strand supply means, and wherein each winding core of said plurality of winding cores comprises an inner core member (6) secured to said winding carrier means, said inner core member having a thickness corresponding to said given thickness of the respective force transmitting element, and removable outer cover means (25) secured to said inner core member (6) on a side thereof facing away from said winding carrier means, whereby a winding space is defined between said cover means and said winding carrier means and by said inner core member therebetween, and control means operatively connected to said drive means for controlling the respective motion of the winding carrier means (5) and fiber strand supply means (12) relative to each other in such a manner that each winding on each winding core is formed as a closed loop from a single fiber strand in said winding space in a removable manner.

2. The apparatus of claim 1, wherein said winding carrier means (5) comprise a winding cylinder (5) having a surface and being supported for controlled rotation about its longitudinal axis (5'), said inner winding core members (6) being exchangeably secured to said surface of said winding cylinder (5) on its circumference at regular angular spacings, and wherein said holding and guide elements (23) for said fiber strand (16) are pins (23) extending in rows along a generatrix and out of the surface of said winding cylinder, said rows of pins (23) being aligned with spaces between adjacent winding cores.

3. The apparatus of claim 1 or 2, wherein said means (12) for supplying a fiber strand to said plurality of winding cores are movable in parallel to a longitudinal axis of said winding carrier means (5), and wherein said fiber strand supply means comprise a guide member (22) having a fiber strand delivery end positioned slightly above said winding carrier means for delivering a fiber strand to a winding operation.

4. The apparatus of claim 1, wherein said plurality of winding cores comprises four winding cores spaced at 90° angular spacings and exchangeably secured to said winding carrier means.

* * * * *